United States Patent [19]

Williams

[11] 3,828,441

[45] Aug. 13, 1974

[54] AUTOMOTIVE AIR FILTER GAUGE

[76] Inventor: Richard E. Williams, 1942 Port Bristol Cir., Corona Del Mar, Calif. 92660

[22] Filed: Sept. 18, 1972

[21] Appl. No.: 290,165

[52] U.S. Cl. ............................................ 33/178 B
[51] Int. Cl. ............................................ G01b 3/34
[58] Field of Search .......... 33/178 B, 178 R, 168 R, 33/143 M; 403/90

[56] References Cited
UNITED STATES PATENTS

| 69,954 | 10/1867 | Richards | 33/178 B |
|---|---|---|---|
| 1,210,963 | 1/1917 | Masher | 33/178 B |
| 3,138,876 | 6/1964 | Graham | 33/143 M |
| 3,586,281 | 6/1971 | Schumer | 403/90 |

Primary Examiner—William D. Martin, Jr.
Assistant Examiner—Willis Little
Attorney, Agent, or Firm—Brown and Martin

[57] ABSTRACT

A gauge for classifying automobile air filters and identifying the applicable maufacturers part numbers. The gauge measures a combination of the inside diameter and relative height. The gauge is in a generally conical form and includes two vertically oriented scales along the surface of the cone. A first scale is designed to be read in association with the lower edge of the generally toridal configured air filters. The scale is marked with a series of part numbers and includes all the numbers that could be expected for air filters of that inner diameter. The second scale is designed to be read in association with the upper edge of air filter when the air filter is lodged with its inner diameter in contact with the conical surface. The second scale includes a list of those part numbers for air filters which lodge with their upper surface at that point. By reading both lists, the operator can identify the single part number which corresponds to an air filter having the inner diameter and height of the filter under measurement. The gauge includes a stand that allows the conical body to be tilted away from an upper support member for insertion of the filter onto the conical surface, and a bearing which permits the rotation of the conical surface to confirm proper alignment of the filter.

6 Claims, 3 Drawing Figures

PATENTED AUG 13 1974 3,828,441
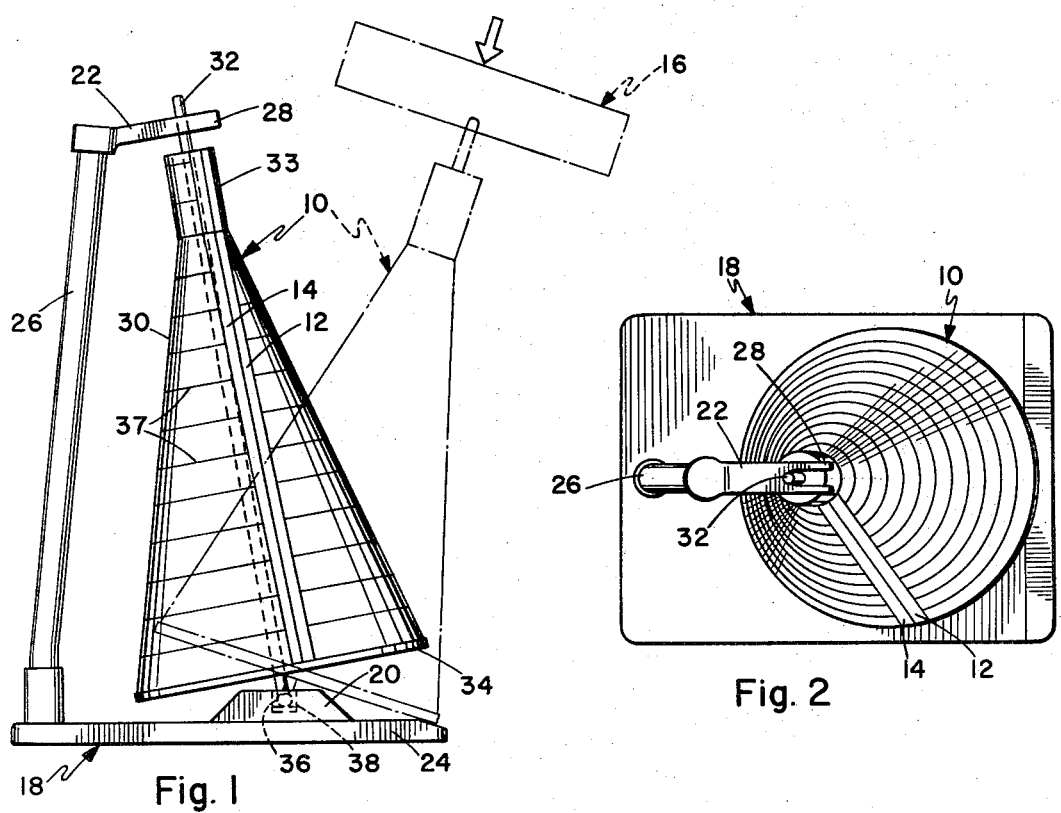
Fig. 1
Fig. 2
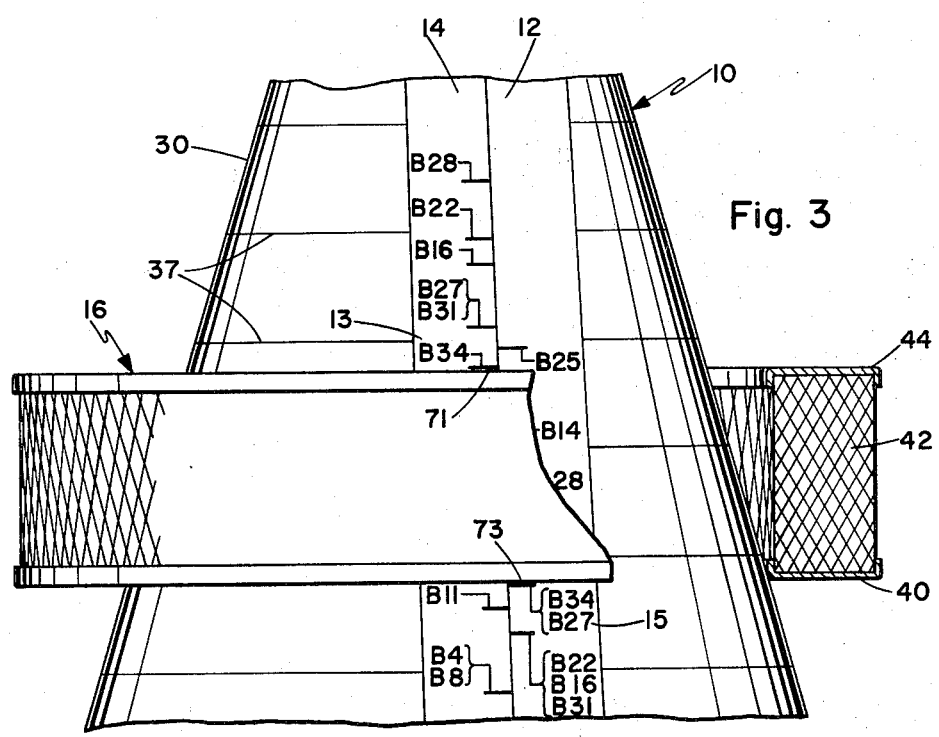
Fig. 3

AUTOMOTIVE AIR FILTER GAUGE

BACKGROUND OF THE INVENTION

In recent years, substantially all of the vehicles being produced have been equipped with disposable type air filter elements. These air filter elements are generally cylindrical in configuration but vary as to their inside diameter, outside diameter and height. In many service stations, as a part of the routine service of vehicles being fueled, the attendant will examine the air filter to determine if the vehicle is being operated within excessively dirty filter. If such a filter is found the attendant will suggest the replacement of the filter. This type of service is mutually beneficial to the vehicle operator and to the service station owner in that it is important to replace the filter element and further that the service station attendant is the logical one to periodically check for an excessively dirty filter.

According to prior art practices, the service station attendant would locate a replacement filter by first inquiring or identifying the vehicle type in which the filter is installed and then by reference to a detailed set of part number charts, determine which of the manufactures filters carried by the service station are a proper replacement for the filter for that filter and engine type. The problem is further compounded in case of a vehicle which has a non-standard air cleaner, in which case it would be necessary to identify a part number on the air filter to be replaced and translate that manufacturers part number to the part number of an air filter from the stock carried in the service station.

In view of the deficiencies of the part number list method for identifying replacement filters described above, there have been proposed air filter gauges for use in service stations and similar operations. One such prior art device utilizes a conical measuring surface to produce an indication of the filter's inner diameter size. Such a technique is impractical for regular use in that there may be a number of air filters having the same inner diameter but with different overall diamters and/or heights.

Therefore it is desirable to have an automobile air filter gauge which is capable of identifying a discrete part number for an air filter by combining in a single measurement the parameters of the inside diameter and height. For the vast majority of filters, it has been found that these two parameters are sufficient to separate out a discrete part number.

SUMMARY OF THE INVENTION

An exemplary embodiment of the invention employs a generally conical body which is rotatably supported on a stand and normally maintained in an inclined orientation. During measuring operations, the conical body portion is tilted on the base away from an upper support member so the air filter may be inserted over the conical measuring body and caused to lodge on the conical surface. The surface is provided with a series of concentric circles spaced along the conical surface, as an aid in determining when the air filter is properly aligned, with its axis parallel to the central axis of the conical body. The operator confirms proper alignment by rotating the conical body on the base to determine that there is no wobble or other evidence of misalignment.

The conical surface is provided with two scales extending over the entire height of the cone. The first scale is intended for use in association with the bottom edge of an air filter positioned on the body. The first indicia means includes a listing of all of the part numbers for air filters having a particular inside diameter. These part numbers are listed in association with a gauge mark which corresponds to the position along the indicia means that an air filter of that inside diameter would lodge. Similarly the second indicia means includes the listing of part numbers for use in association with the upper surface of an air filter. The part numbers are grouped in association with a gauge mark read by sighting along the upper surface of the air filter. The gauge marks may be a discrete line or merely constitute some reference in the list of part numbers. The listing of part numbers would include all those part numbers on air filters which would have an upper surface oriented at the level of the gauge mark.

For any air filter that has a unique combination of inside diameter and height, there will only be one common number in the listing of the part numbers associated with gauge marks on the first and second indicia means. Thus the operator is provided with a positive identification of the applicable manufactures part number corresponding to the filter under inspection.

It then becomes a simple matter to retrieve a new filter corresponding to the applicable manufactures part number with a high degree of assurance that the filter thus obtained will fit properly in the automobile being serviced.

It is therefore an object of the invention to provide a new and improved automotive air filter gauge for identifying air filters.

It is another object of this invention to provide a new and improved automotive air filter gauge that provides for proper alignment of an air filter on a gauging surface.

It is another object of this invention to provide a new and improved automotive air filter gauge which speeds the identification of a part number corresponding to the equivalent air filter.

It is another object of this invention to provide a new and improved automotive air filter gauge that is low in cost and simple to produce.

It is another object of this invention to provide a new and improved automotive air filter gauge which is readily adaptable to producing part numbers from a variety of manufacturers air filter supply.

It is another object of this invention to provide a new and improved automotive air filter gauge that reduces the time required to identify a discrete part number for replacement of an automotive air filter.

It is another object of this invention to provide a new and improved automotive air filter gauge that is easy to use and durable.

Other objects and many attendent advantages of the invention will become more apparent upon a reading of the following detailed description together with the drawings in which like reference numerals refer to like parts throughout and in which:

FIG. 1 is a side elevation view of the gauge unit illustrating the loading operation.

FIG. 2 is a top plan view of the gauge unit.

FIG. 3 is an enlarged side elevation view showing the positioning of a typical air filter element relative to the gauge scales.

Referring now to the drawings, there is illustrated a gauge means 10. Gauge means includes a generally conically shaped surface 30 with a cylindrical extension 33 and a pair of indicia means 12 and 14. The indicia means extend along these conical surfaces and are marked with groups of part numbers as at 13 and 15. A gauge mark, such as at 71, is utilized to indicate the exact spacial relationship of the part number group on the indicia means.

The gauge means is mounted on an axially positioned rod 32. Rod 32 includes a spherical bearing end 36. The bearing end 36 of rod 32 serves to support the gauge means in a bearing recess 38 in bearing support 20. The bearing support 20 is received on a generally horizontal portion 24 of base 18. Base 18 also carries tubular member 26 which receives at its upper end, upper support member 22 including fork member 28.

Thus in the normal resting position illustrated in FIGS. 1 and 2, the conical gauge means is inclined at an angle from the vertical, held by the force of gravity in the fork member 28 of the upper support means, and held for rotation in the bearing recess 38.

The gauge means may be tilted to the dotted line configuration illustrated in FIG. 1 to receive an air filter 16 for testing. An air filter 16 is illustrated as being received over the conical surface in FIG. 3. The air filter 16 has a filter element 42, operative retainer ring 44, and lower retainer ring 40. The filter is received in alignment with the concentric alignment marks 37. Gauging against the indicia means 12 and 14 is accomplished by sighting along the lower edge of the air filter so as to read the gauge mark 73 indicating the numeral group 15, on the first indicia means and the gauge mark 71 indicating part number Group 13 on the second indicia means. In the exemplary embodiment, the sole part number common to the lifts is shown enlarged for clarity to be the part number B-34.

OPERATION

In use, the service station attendant upon determining that a particular air filter is in need of replacement would tilt the gauge means to the dotted line position illustrated in FIG. 1 and install the air filter over the conical gauging surface 30. As a guide to the proper alignment of the air filter on the gauging surface, the operator would sight along the upper and lower edges of the air filter to determine that there is equal spacing from the concentric alignment marks 37. Alternatively or as an additional assurance of proper alignment, the operator may rotate the conical gauging surface on the bearing ball 36 in bearing recess 38 and inspect the rotating air filter to determine if there is any visible "wobble." The absence of any such "wobble" would indicate that the filter was received properly and in proper alignment on the surface for gauging. It would then be possible for the operator to sight along the lower edge 40 of the air filter and identify the group of part numbers association with that position. Subsequently, the operator would sight along the upper edge 44 of the air filter 16 and determine the group of part numbers associated with that position. In normal experience, there would be only one part number in common between these two lists and by isolating this part number, the operator would have determined the correct replacement air filter. The old air filter may then be removed from the gauge means and discarded, and the operator would retreive a proper new air filter with the part number determined by the gauging process and install it in the vehicle.

The cylindrical extension 33 is utilized with smaller diameter filters to read the part numbers from the second indicia means associated with the upper edge 44 of the filter.

Should it become necessary to change the indicia means as in the instance of changing to the air filters of another manufacturer, it would only be necessary to remove the tape like indicia means by process similar to adhesive tape, or to merely tape over the new indicia means for the new manufacturer's part number.

Having described my invention, I now claim.

1. Apparatus for identifying automotive air filters by utilizing their physical dimensions comprising:

conical gauge means having a substantially conical gauging surface for receiving an automotive air filter and positioning said filter along the axial length of said conical gauging surface of said conical gauge means and the inner diameter of said filter, first indicia means comprising a plurality of first gauge marks associated with a grouping of part numbers corresponding to the filters to be identified extending along said conical surface between the upper and lower portions thereof and readable in association with the lower edge of an automotive air filter, second indicia means comprising a plurality of second gauge marks associated with a different grouping of said part numbers and extending along said conical gauging surface from the upper to the lower portions thereof, said second gauge marks corresponding to part numbers in said first indicia being axially displayed along said conical gauging surface from said first gauge marks in corresponding to the same part numbers in said first indicia means, said first and said second indicia means for isolating a single part number for an air filter in a single measuring operation.

2. Apparatus according to claim 1 further including:

stand means for supporting said gauge means on said bearing means, said stand means including upper support means for supporting the upper end of said conical guage means during measuring, and for movement of said upper end away from said upper support means for insertion and removal of said air filter.

3. Apparatus according to claim 2 wherein, said gauge means is supported with its axis inclined from the vertical.

4. Apparatus according to claim 1 further including:

bearing means for permitting rotation of said gague means.

5. Apparatus according to claim 3 further including stand means for supporting said gauge means on said bearing means, said stand means including upper support means for supporting the upper end of said conical gauge means during measuring and for movement of said upper end away from said upper support means for insertion and removal of said air filter.

6. Apparatus according to claim 1 further including:

a plurality of concentric circular markings on said surface of said gauge means.

* * * * *

UNITED STATES PATENT OFFICE
CERTIFICATE OF CORRECTION

Patent No. 3,828,441   Dated August 13, 1974

Inventor(s) Richard E. Williams

It is certified that error appears in the above-identified patent and that said Letters Patent are hereby corrected as shown below:

Cover page line 76, the Inventor's address should read Richard E. Williams "1942 Port Bristol Cir., Corona Del Mar, Calif. 92660" should read --1942 Port Bristol Cir., Newport Beach, Calif. 92660--.

Signed and sealed this 22nd day of October 1974.

(SEAL)
Attest:

McCOY M. GIBSON JR.
Attesting Officer

C. MARSHALL DANN
Commissioner of Patents